Patented Apr. 23, 1940

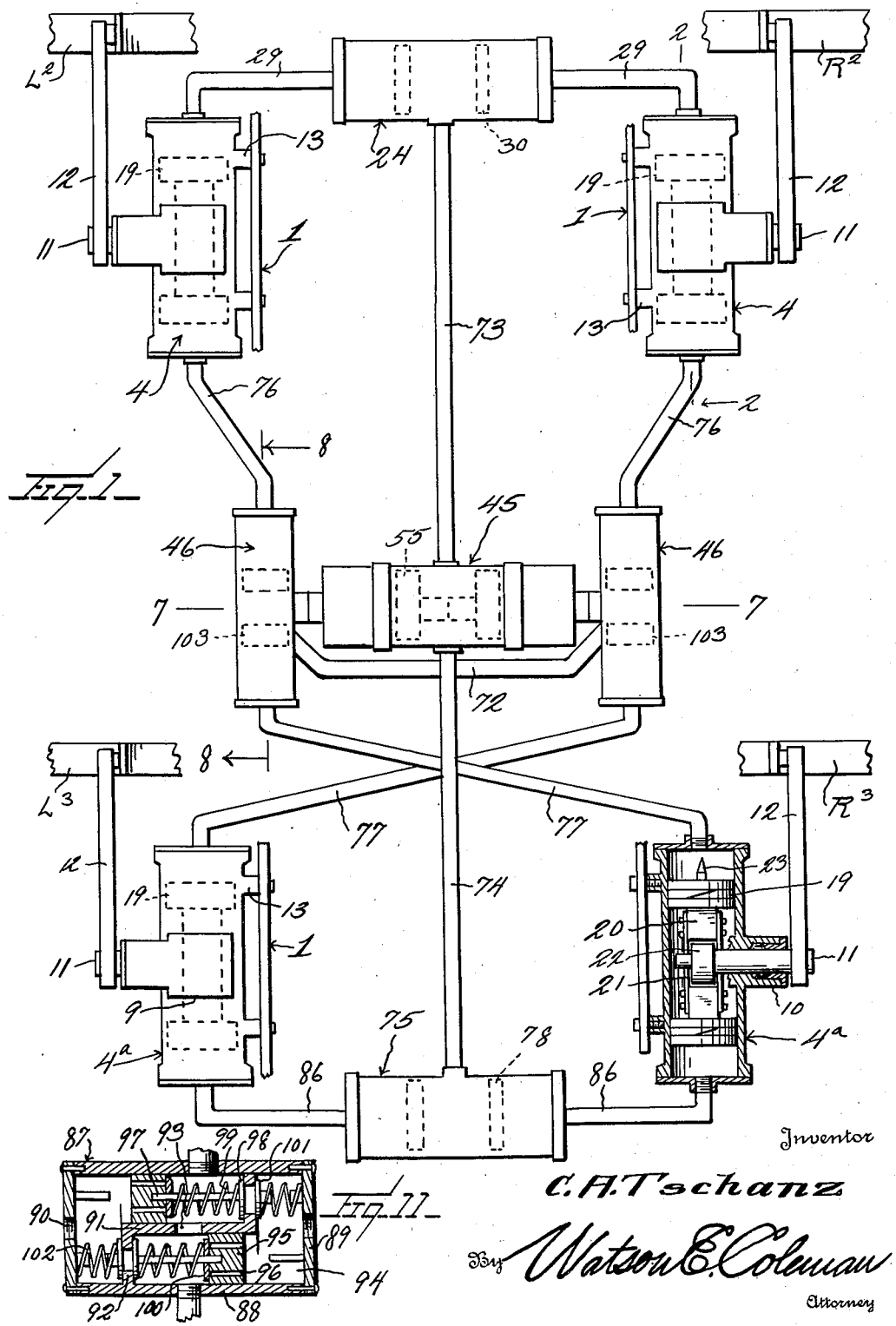

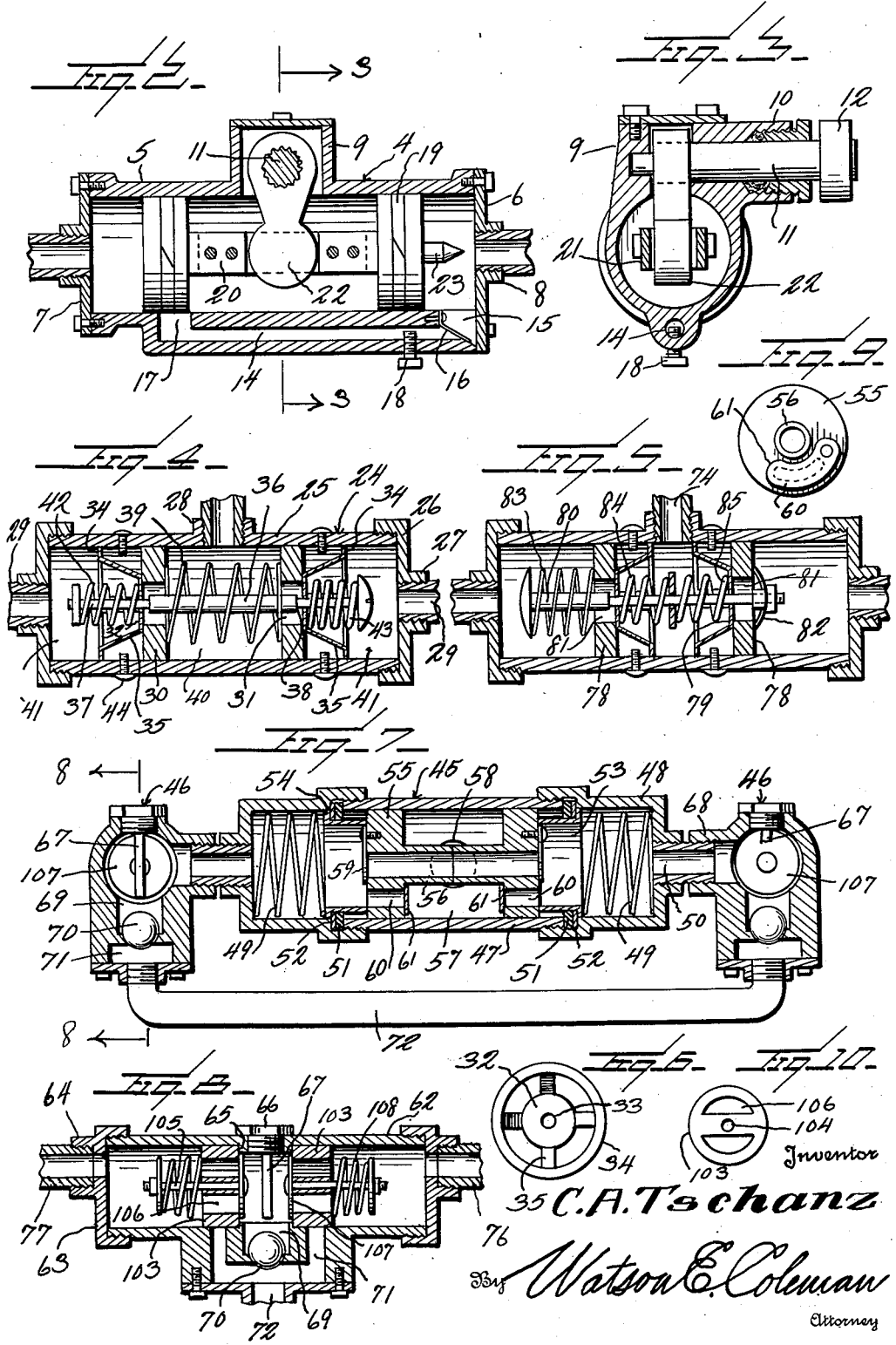

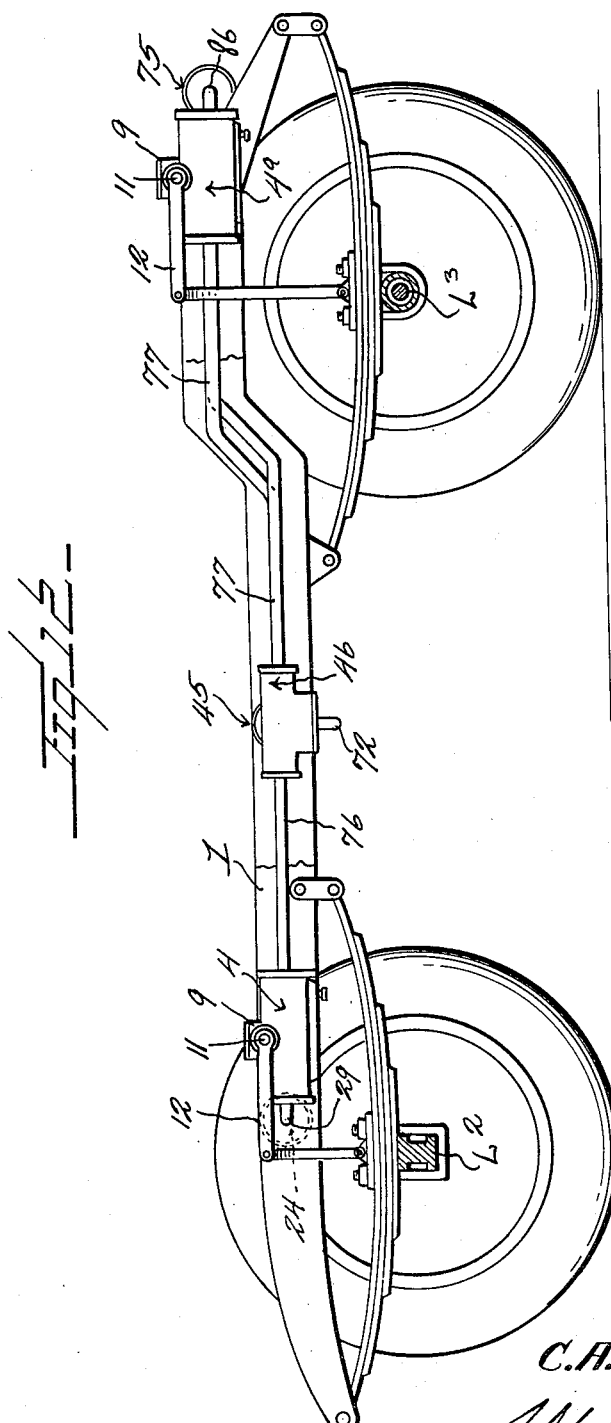

2,198,019

UNITED STATES PATENT OFFICE 2,198,019

SPRING AND SWAY CONTROL SYSTEM FOR WHEELED VEHICLES

Carl A. Tschanz, Cincinnati, Ohio

Application January 14, 1939, Serial No. 250,995

9 Claims. (Cl. 280—124)

This invention relates to improvements in control mechanism for use in association with the running gear of wheeled vehicles and pertains particularly to an improved hydraulic control mechanism.

The primary object of the present invention is to provide an improved stabilizing and spring control mechanism or system which is designed to permit the use of flexible springs while controlling the action of the same to the extent of restricting or eliminating undesirable movements thereof which would tend to impart shock to the body of the vehicle which the springs support.

Another object of the invention is to provide an improved hydraulic spring stabilizing system which effectively operates to suppress side sway of the vehicle body in addition to resisting and stabilizing other undesirable spring movements without impairing those movements of the springs which are essentially necessary.

Another object of the invention is to provide in a system of the above described character, an improved and novel fluid moving unit associated with each spring of the vehicle in which the system is employed, which unit operates as a fluid reserve source in addition to functioning as a means for impelling movement of the fluid in the system upon shock and rebound action of the adjacent connected vehicle spring.

Another object of the invention is to provide a novel and improved stabilizing valve unit for use in a system of the character stated.

A still further object is to provide novel resistance valves for use in the fluid lines connecting the fluid impelling units with the stabilizing valve and with one another.

Other objects and advantages of the invention will become apparent as the description of the same proceeds and the invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 illustrates a layout of the present stabilizing and spring control system showing the connections of the impeller units between the vehicle body and the adjacent axles.

Fig. 2 is a longitudinal sectional view taken on the line 2—2 of Fig. 1 through a front impeller unit.

Fig. 3 is a sectional view on the line 3—3 of Fig. 2.

Fig. 4 is a sectional view taken on a horizontal plane through the resistance valve which is connected in the forward or front part of the system as it is laid out in Fig. 1.

Fig. 5 is a horizontal sectional view taken through a resistance valve which constitutes a slightly modified form of the valve shown in Fig. 4 and which is connected in the system at the end thereof opposite from the first resistance valve.

Fig. 6 is a detailed view in elevation of a fluid check disk such as is used in the resistance valves.

Fig. 7 is a sectional view taken on the line 7—7 of Fig. 1, showing at the center the stabilizer valve and the lateral auxiliary valves.

Fig. 8 is a longitudinal sectional view of an auxiliary valve taken on the line 8—8 of Fig. 7.

Fig. 9 is a view in end elevation of a valved piston forming a part of the stabilizer valve.

Fig. 10 is a view in end elevation of a piston of the auxiliary valves.

Fig. 11 is a longitudinal sectional view through a modified form of stabilizer valve.

Fig. 12 is a view in side elevation of a vehicle chassis equipped with the mechanism embodying the present invention, the wheels upon the near side of the chassis having been removed and the axles being shown in section.

Referring now more particularly to the drawings, a description will be first given of the parts of the system and the manner in which the several parts are connected together and between the vehicle chassis frame and springs of the running gear after which the operation of the parts will be set forth.

Referring particularly to Fig. 1, portions of a vehicle chassis frame are shown and indicated by the numeral 1, these portions of the frame being located over the vehicle front and rear springs (not shown), and adjacent to the front and rear axles, the ends of which are identified by the numerals L—2 and R—2 for the left and right ends, respectively, of the front axle, and L—3 and R—3 for the left and right ends, respectively, of the rear axle.

Secured to the chassis frame 1 adjacent each of the springs is a fluid impeller unit and two units at the front of the vehicle are indicated generally by the numeral 4, while those at the rear are indicated by the numeral 4ª. Thus there are four of these units in the system and the construction of them is substantially the same for each except that the front units have a by-pass which the rear units do not have and which will be hereinafter more particularly referred to. Except for this by-pass of the front units, the construction of the units is the same and, therefore, the following description will apply to each and in connection with the same reference should be had to Figs. 2 and 3 of the drawings. Each of the impeller units includes a piston cylinder 5 having the front and rear closure plates 6 and 7, respectively, which are provided with threaded pipe nipples 8 for connection in the system as hereinafter described. At the top of each cylinder 5 there is formed a housing 9 which opens downwardly into the cylinder at the transverse central portion thereof and this housing at one side is extended to form the bearing sleeve 10 in which is mounted a rock shaft 11. Connected at the outer end of the rock shaft is a connecting arm 12 which couples the shaft 11 with the adjacent underlying axle, the connection of the end of arm 12 with the axle being such as to permit the relative vertical movement between the axle and unit cylinder 5 which is secured by means of the integral bosses 13 to the adjacent portion of the chassis frame 1.

The nipple 8 at the front end of each unit constitutes a shock discharge port and the nipple at the rear of each unit constitutes a rebound discharge port for the fluid of the system.

The lower part of each front impeller unit cylinder 5 is provided with a longitudinally extending by-pass passage 14 which at its forward end opens upwardly into the cylinder through port 15 and is closed by the upwardly opening flap valve 16. The rear end of this by-pass passage 14 has the upwardly extending port 17 which opens into the cylinder 5 adjacent the opposite or rear end. Screw means 18 is also provided for controlling the flow of fluid through the passage 14.

Within the cylinder 5 of each of the impeller units 4 and 4ᵃ are the two spaced pistons, each of which is indicated by the numeral 19, these pistons having upon their opposing or confronting sides the studs 20 which are joined together by the plates 21. The plates and the spaced studs thus form a central area in which is loosely fitted an end of a thrust finger 22 which is carried by and extends downwardly from the inner end of the rock shaft 11.

When the pistons 19 of the front units 4 are in what might be termed normal or centralized position, the rear piston will be over and will close port 17 of the by-pass passage 14 and the front piston will be rearwardly of the discharge port 15, at the other end of the passage.

The front piston in each impeller 4 and 4ᵃ is provided with a pointed valve stem 23 which is adapted to enter a fluid pipe connected with the adjacent outlet nipple 8.

As shown in Fig. 1, there are four of the impeller units described and they are arranged so that the thrust arms 12 are all directed forwardly and downwardly for connection with the adjacent axles. Thus it will be seen that upon thrust movement being imparted to each of the arms, by which is meant an upward movement of the arms, the pistons of each unit will be moved forwardly in their cylinder.

At one end of the control system, here shown as the front end, there is disposed a resistance valve, the detailed construction of which is shown in Fig. 4. This valve is designated as a whole by the numeral 24 and consists of a cylinder 25 which is horizontally disposed in the system and which has its ends closed by the caps 26, each of which has a threaded port 27. Intermediate the ends of the cylinder 25 is a threaded port 28.

The ports 27 of the resistance valve 24 are connected by pipes 29 with the front ends of the front impeller units 4. Within the resistance valve 24 are two piston disks 30, each of which has a central fluid port 31 therethrough and disposed upon the outer side of each disk 30 is a check disk 32, which in addition to having a central opening 33 therethrough, is connected with the guide ring 34 by means of the arms 35 which extend in divergent relation outwardly from the periphery of the check disk to the guide ring. This guide ring has snug sliding engagement in the cylinder and the check disk positions against the outer face of the adjacent piston disk to cover and close the port 31 therethrough.

Extending longitudinally of the cylinder 25 and through the ports 31 of the piston disks, is a free moving stem 36 which has at each end a reduced portion 37 whereby there are formed the stop shoulders 38. These shoulders normally lie within the ports 31 of the piston disks, the disks being held in a predetermined relation upon opposite sides of the port 28, by a coil spring 39 which encircles the stem and bears at its ends against the disks. The resistance valve is thus divided into a central chamber 40 and two end chambers 41. Encircling the reduced end portions 37 of the stem are springs 42 and 43 which lie within the end chambers 41, and the spring 43 is of greater strength than the spring 42, while the central chamber spring 39 is weaker than the spring 42. Thus the strengths of the three springs progress from 39, which is the weakest, to 43, which is the strongest, and as will be seen, the springs 42 and 43 are each connected at one end with the stem and have their other ends bearing against the adjacent check disks to maintain the latter against their respective piston disks.

Interposed between each check disk ring 34 and the adjacent piston disk is a stop 44 which is carried by the wall of the cylinder. This stop limits the movement of the adjacent piston disk in one direction and of the adjacent check disk in the opposite direction, as will be hereinafter more fully described.

In the central part of the system is a valve which is indicated generally by the numeral 45 and which is termed the stabilizer valve. This valve is disposed transversely of the system and has at each end a smaller or auxiliary valve, each of which is generally indicated by the numeral 46.

Fig. 7 illustrates in detail the parts of the stabilizer valve and shows the connections of the same with the auxiliary valves. As shown in this figure, the stabilizer valve consists of a central cylinder 47 which is covered at each end by a spring enclosing cap 48, the spring therein being indicated by the numeral 49. Each cap has a fluid nipple 50 connected therewith to extend outwardly for connection with the adjacent auxiliary valve as hereinafter described, and at its inner end, each cap compresses between itself and the adjacent end of the cylinder 47, the resilient and metallic sealing rings 51 and 52, respectively. These rings project into the circular area defined by the interiors of the caps and the cylinder.

Extending through each pair of rings 51—52 is a sliding sleeve 53 which has a flange 54 upon the end nearest the adjacent spring 49, which engages the adjacent ring 52 and limits the movement of the sleeve toward the central part of the valve. This movement is imparted by the adjacent spring 49 which is of the expansion type and, therefore, normally maintains the flange 54 against the adjacent movement limiting ring 52.

When the sleeves 53 are in the extreme positions to which they may be moved by the adjacent springs, they contact at their inner or confronting ends with piston heads 55, each of which has a short tubular stem 56, the passage of the stem extending through the piston head, as shown. The inner ends of these tubular stems are normally in contacting relation. There is thus formed between the piston heads 55 the center fluid receiving chamber 57, and the cylinder 47 is provided at opposite sides with ports 58 which open into this central chamber.

Upon the outer side of each piston head 55, a resilient flap disk 59 is secured which normally covers the end of the stem passage opening through the piston head. In addition to the passage of the stem through the head, each head is provided with a through or transverse passage 60 which is covered upon the side which is within the chamber 57, by the spring plate 61. This plate is more particularly shown in Fig. 9 and, as shown, is secured at one end and is adapted to move relative to the passage 60 so as to open and close the same.

Each of the auxiliary valves 46, a detail showing of one of which is made in Fig. 8, comprises a cylinder 62 which is closed at each end by a cap 63 which has an eccentrically located threaded nipple 64. Upon each side of the transverse center of the cylinder 62 is a piston stop shoulder 65 and between these shoulders a threaded plug is secured in the wall of the cylinder, as indicated at 66, which carries a stem 67 which extends across the central part of the cylinder. The area between the shoulders 65 forms a central chamber into which the nipple 50 at one end of the stabilizer valve opens through the medium of the threaded connection 68.

Upon the side of the cylinder 62 from the plug 66, the body of the cylinder is enlarged to form a fluid inlet passage 69 which is controlled by a ball check 70, and two outlet passages 71 disposed upon opposite sides of the passage 69, which at one end open into the cylinder at one side of a shoulder 65 while at the other ends they join for communication with a transfer pipe 72. This transfer pipe connects the passages 71 of one auxiliary valve with those of the opposite auxiliary valve, as shown in Fig. 7.

Within the cylinder 62 there are the two pistons, each of which is indicated by the numeral 103, and each of these pistons has a central passage 104, Fig. 10, for the extension therethrough of a stem 105, and two fluid passages 106. These pistons 103 are limited in their movement toward one another by the stop shoulders 65 and when they are in engagement with these shoulders there remains a central chamber into which the passage controlled by the ball check 70 opens and each of the pistons covers an end of a passage 71 which leads into the cylinder. Carried by and secured to each of the stems 105 so that it may not have movement independently of the stem, is a valve disk 107 which is disposed against that face of the adjacent piston body which is in opposition to the other piston. Upon the opposite side of each piston from the disk, a spring is located which surrounds the stem and is secured at one end thereto and has its other end bearing against the adjacent piston to hold the disk 107 in closing position thereon with respect to the fluid passages 106. Due to the offset or eccentric location of the outlet nipples 64, it will be seen that when the pistons 103 move toward the outer ends of the cylinder, the stems 105 will abut the caps 63 to effect the shifting of the stems in a direction which will move the disks 107 away from the pistons so as to open the passages through the pistons. This action will be more particularly described in the hereinafter set forth statement of operation of the system.

In the system one of the central ports 58 of the stabilizer valve is connected by a pipe 73 with the nipple 28 leading into the central chamber 40 of the resistance valve 24 and the other port 58 of the stabilizer valve is connected by a pipe 74 leading rearwardly to a second resistance valve which is indicated generally by the numeral 75 and which will be hereinafter more specifically described.

Each of the auxiliary valves is connected at one end by a pipe 76 with the rear end of the adjacent front impeller unit 4 and the opposite end of each auxiliary valve is connected by a cross-over pipe with the front end of the remote rear impeller unit 4a or, in other words, with the impeller unit adjacent to the opposite auxiliary valve.

The rear resistance valve 75 is of the same construction as the front valve 24 except for the fact that the piston disks, which are here indicated by the numeral 78, have the check disks between them instead of upon the outer or remote sides thereof. These check disks are of exactly the same construction as the one shown in Fig. 6 and specifically described in connection with the valve 24 and, therefore, they will be merely generally designated by the identifying numeral 79. The stem 80 which passes through the central passages 81 of the piston disks of this unit is connected at one end by the spider 82, with the outer side of a disk 78, and passes through to the far side of the opposite disk 78 where it carries the weak expansion spring 83, one end of which is connected to the stem while the other end bears against the adjacent piston disk. Interposed between the check disks 79 are the two springs 84 and 85, the spring 84 being stronger than the spring 83 but slightly weaker than the spring 85. The central chamber of the rear resistance valve has the pipe 74 leading thereinto, as shown in Fig. 1, and leading from the outer chambers of this resistance valve are the pipes 86 which connect the valve with the rear ends of the adjacent impeller units 4a.

Fig. 11 illustrates a slightly modified form of the stabilizing valve which is disposed at the center of the system. This modified stabilizer valve is generally designated by the numeral 87 and consists of the cylinder 88 closed at the ends by the caps 89, each of which has a port 90 opening therethrough for connection with an auxiliary valve. Within the cylinder is a longitudinal dividing partition 91 which terminates short of the ends of the cylinder and joins the oppositely directed centrally apertured walls 92. This partition 91 has a central transverse passage 93 therethrough. This cylinder 88 is thus divided into two longitudinally extending overlapping chambers 94 and in each there is disposed a sliding piston 95 which has longitudinal fluid ports 96 therethrough. These pistons 95 are upon opposite sides of the transverse center of the cylinder and central transverse port 93, as shown, and each carries a stem 97 which upon its outer end has a plate 98 which normally covers the passage through a transverse wall 92, the stem also carrying a spring 99 and a valve disk 100, which is movable on the stem and is pressed by the spring against the rear side of the piston to close the pasages 96.

Opposing each of the stem carried disks 98 upon the opposite side of the wall 92 therefrom is a spring-pressed valve disk 101 which is normally maintained in closed position by a spring 102.

In addition to the end ports 90 for the modified stabilizer valve there are also ports at the central part thereof for the connection therewith of the pipes 73 and 74, which pipes lead into the areas between the pistons and the opposed walls 92 when this form of valve is used in place of the valve 45.

When the system is in operation, all of the cylinders and the pipes will, of course, be filled with fluid and the area of each impeller unit, between the two pistons therein, will be filled and will form a reserve reservoir for the system from which fluid may be drawn to replenish any which may escape by leakage.

As previously stated, all of the impeller units are disposed so that the actuating lever arms or thrust arms 12 extend forwardly for connection with the adjacent axles and thus when shock is imparted to the front springs or to the back springs, fluid will be forced from the shock discharge ports 8 at front ends of the cylinders of the impeller units, but in the case of the front units, such fluid would be forced through the pipes 29 into the ends of the resistance valve 24, where its flow would be only slightly resisted until the rings of the check disks, moving with the piston disks, are stopped by the stops 44, whereupon the piston disks would continue to be moved together against the resistance of the interposed weak spring and the fluid would flow through the resistance or flow retarding valve through the line 73 into the central chamber of the stabilizing valve 45. The volume of fluid is increased in this central chamber while the volume is decreased in the end chambers when the pistons in the front impeller units move forwardly. This increase in the volume of fluid in the central chamber will force the pistons 55 of the stabilizer valve away from each other, thus opening the passage through the tubular stems 56. The fluid can then pass through these stems and past the resilient flap valves 59 into the end chambers of the stabilizer valve 45 and through the nipples 50, into the space between the two pistons 103 of the auxiliary valve 46 (see Fig. 8). These pistons 103 of the auxiliary valves, which carry the plates 107 and the stems 105 of the plates are moved toward the outer ends of the cylinders 62. When the stems 105 abut the end caps 63, the pistons 103 separate from the plates 107, opening the passage 106, through which the fluid flows into the pipes 76 to the rear end of the front impeller units where the space for the fluid has increased.

With the application of a shock to the thrust arms of the rear impeller units, the fluid would be forced directly through the lines 77 into the ends of the auxiliary valves 46. The fluid proceeds to move the pistons 103 against the stop shoulders 65, if they are not already in this position. The plates 107 of the auxiliary valves then will be forced away from the pistons 103 to allow the fluid to pass into the central chamber of the auxiliary valve and through the nipples 50 into the end chambers of the stabilizer valve 45. The fluid will then force open the resilient valve plate 61 and will pass into the central chamber of the auxiliary valve and through the pipe 74 into the central chamber of the rear resistance of the valve 75, which valve is shown in detail in Fig. 5. The fluid will then force the disks 78 of the rear resistance valve toward the outer ends of the cylinder until the check disks 79 rest against their respective stops while the piston disks move further to open the passage 81, through which the fluid flows into the pipes 86 to the rear ends of the rear impeller units.

It will be seen from the illustration of the impeller unit in Fig. 2 that when the pistons therein are moved upon the application of shock to the thrust arm 12, or, in other words, when the attached vehicle spring is compressed, the end of the assembly carrying the flow retarding tip 23 will move toward the adjacent end of the cylinder. This will force out fluid into the outlet line and will force the flap valve 16 to closed position. Upon return of the pistons, following the movement of the rear one of the two past the port 17, this return movement being made upon rebound or reflexing of the spring, the fluid may pass through the by-pass passage 14 until the said rear piston closes the port 17. As previously stated, this port is normally closed by the piston when these front units are in normal position or in position between the application of shock to the springs and the reflex or rebound action. When the pistons of these front impeller cylinders move in the opposite direction or on rebound far enough that the port 17 becomes uncovered, the by-pass is connected with the reserve fluid contained in the cylinder between the pistons so that if any additional fluid is needed in the system, it may be drawn in by the forward piston.

In the operation of the present system in the control of side sway motion of a vehicle body carried upon the chassis frame with which the impellers are connected, consider that the impeller units or the pistons of such units are operated at the right-hand side of the vehicle to move forwardly as would be the case if this side of the vehicle were lowered while the pistons of the units upon the left-hand side move rearwardly as they would do if the left side of the vehicle moved upwardly. Such motion might be imparted to the pistons of the units as the vehicle is rounding a curve to the left. Under such conditions, the pistons in the impeller units R—2 and R—3 move forwardly as previously stated, and the pistons in the units L—2 and L—3 move rearwardly and fluid would be forced rearwardly from the left front unit 4 and forwardly from the right rear unit 4ᵃ through the pipes 76 and 77, respectively, into the two ends of the left auxiliary valve 46. Such fluid would then pass from the left auxiliary valve to the left chamber of the stabilizer valve 45, wherein pressure would act against the left-hand piston 55. The rearward movement of the pistons of the left rear unit 4ᵃ and forward movement of the pistons of the right front unit 4 would produce pressure in the middle chamber of the stabilizer valve equal to the pressure developed in the left chamber thereof.

It will be observed that if the pistons 103 in the left auxiliary valve are not over the ports 71 to prevent the passage of fluid through the cross-over pipe 72, they will be moved to such position by the described flow of fluid and remain there. The movement of these pistons 103 away from the ports 71 would be adverse to the flow, or the potential flow, of fluid, however if one of these pistons would be forced away from its port, by pressure from the oppoite end of the valve member, the fluid in back of this piston would be retained to preserve stabilization so long as the piston is away from the stop 65 and the port 71 adjacent to it. For instance, if the rear right impeller piston were moved forwardly by a road shock delivered by the vehicle through the adjacent arm 12, fluid would be forced through pipe 77 from this unit into the left auxiliary valve, through the passage 106 in the rear piston 103 of this valve and against the front piston 103, forcing it away from its stop 65 and from over the port 71 adjacent thereto. The fluid forced from the right rear impeller unit will then pass from the left auxiliary valve into the stabilizing valve 45, through the passage 60 in the left piston 55 and then out through the pipe 74 to the central chamber of the rear resistance valve 75 and from there through the pipe 86 into the rear of the right rear impeller unit. The downward force of the side sway movement on the right-side under these conditions will be counteracted by the upward force of the road shock and piston in the right front impeller unit will remain stationary or nearly so and, therefore, little or no fluid will pass through the open front port 71 in the left auxiliary valve and through the cross-over pipe 72 into the right auxiliary valve. Also, the fluid trapped in the left pipe 76 will prevent the piston in the left front impeller unit from moving rearwardly. It is to be remembered that this rearward movement of the piston of the left front unit would allow the vehicle body to rise on this side due to side sway force. Upon the return of the piston in the right rear impeller unit to its position which it occupied previous to the road shock above described, the fluid will pass from the rear chamber through the pipe 86 to the rear valve 75 and through this to and through the pipe 74 into the central chamber of the stabilizer valve where the pressure will force apart the pistons, causing the ends of the stems to separate. The fluid then passes through the stem 56 of the left piston 55, past the resilient flap valve plate 59, into the central chamber of the left auxiliary valve 46. The fluid will cause the rear piston 103 of this left auxiliary valve to move toward the end cap 63 sufficiently far to effect separation of the plate 107 therefrom, as the stem 105 abuts the end cap 63. The fluid then passes through the opening 106 and into the pipe 77 to the front end of the right rear impeller unit.

It is possible that a small amount of fluid may pass through the stem 56 of the right piston 55 of the stabilizer valve and to the right front and left rear impeller units, while the stems 56 are separated. However, the pressure transmitted by the rearward movement of the piston in the right rear impeller unit, to the fluid in the line 86 which connects the rear ends of the rear impeller units, will counteract the rearward movement of the piston in the left rear impeller unit. This rearward movement would cause the body of the vehicle to rise and as long as the body does not rise, the piston in the left front impeller unit will remain stationary. So long as the piston in the left rear impeller unit does not move, no fluid will pass through the stem passage 56 of the right piston in the stabilizer valve 45, into the right auxiliary valve 46 and through the pipe 77 into the front of the left impeller unit. If the piston in the right front impeller unit does move forwardly, the rearward movement of the piston in the right rear impeller unit will be decreased equally. This will shorten the duration of the separation of the pistons 55 in the stabilizer valve and prevent an excessive flow of fluid therethrough.

The force of the fluid created by the rearward movement of the right rear impeller unit piston acting against the rear of the piston in the left rear unit and against the front of the piston in the right front unit, will maintain stabilization during the instant when the pistons 55 in the stabilizer valve are separated.

Considering now a case where the pistons in the two impeller units on one side of the vehicle move under shock in the same direction and oppositely to the pistons on the other side as, for example, when the pistons on the left side of the system are moved forwardly upon the compression of the vehicle springs by road shocks, if at the very moment that these pistons reverse themselves, that is, begin to move rearwardly, the pistons on the right side should be forced forwardly by road shock, the transmission of fluid in the system will take place in the following manner. At first the piston of the left front unit is in advance of the by-pass 17 of that unit and as this piston moves rearwardly, the fluid will be displaced through the by-pass into the front end of the impeller unit. As the piston of the right rear unit moves forwardly, it forces fluid through the pipe 77 into the left auxiliary valve and moves the front piston 103 of this valve away from the port 71, if the piston happens to be over the port and the fluid is then free to pass through the cross-over pipe 72 into the other auxiliary valve and out through the pipe 76 to the right front impeller unit and also through the pipe 77 to the left rear impeller unit. This action is brought about through the separation of the pistons 103 of the right auxiliary valve to the point where the stems engage the caps 63 so as to unseat the disks 107, thus permitting the fluid to flow through the pipes 76 and 77, as stated. The fluid from the right rear impeller unit can also pass through the left auxiliary valve and the pipe 76 connected thereto into the left front unit, then through the by-pass to and through the pipe 29 to the front resistance valve 24, passing then to the pipe 73, the central chamber of the stabilizer valve 45, through the pipe 74 to the rear resistance unit and from there through the pipe 86 into the rear of the right rear impeller unit. In the above order, the fluid pressure is dissipated in the left auxiliary valve and the left chamber of the stabilizer valve, permitting the separation of the pistons 55 due to the pressure exerted on the fluid by the forward movement of the piston in the right front unit and the rearward movement of the piston of the left rear unit. When these pistons of the stabilizer valve are separated, the fluid can pass out of this valve into the right auxiliary valve through the pipes 76 and 77 to the right front and left rear units, respectively. The by-pass in the left front unit and the front port 71 in the left auxiliary valve will be held open by the force of the forward movement of the piston of the right rear unit. When this forward movement of the piston of the right rear unit is completed, the piston of the left front unit can resume its normal position rearwardly of the by-pass. This will effect at the same time the closing of the front port 71 of the left auxiliary valve by the slight movement of the fluid and which will be imparted to the front piston 103 of the left auxiliary valve which will shift this piston into port closing position. The piston of the left rear unit will come to its normal position at the same time as the piston of the left front unit.

As the pistons of the right front and right rear units move rearwardly upon completion of their forward movement, the fluid in the system will flow first through the pipe 76 from the right front unit into the right auxiliary valve and will pass through the front piston 103 of this valve to the central chamber and force the rear piston 103 away from the port 71 which it covers, if it should be in covering relation with this port. As the fluid moves the rear piston 103, in the right auxiliary valve 46, away from the port 71, if the valve should be in covering relation with this port, the fluid will then pass through the pipe 72 into the central chamber of the left auxiliary valve by raising the ball check 70. Since the piston in the right rear impeller unit moves rearward the space for fluid will be increased in the front end of this unit or, in other words, there will be a decrease in the fluid pressure in the front end of the unit and in the line 77, therefore, the fluid will flow rearwardly out of the left auxiliary valve through the pipe 77 to the right rear impeller unit. During this movement of the fluid under the impulse of the piston in the right front unit, the fluid set in motion by the piston of the rear right unit will pass from the rear end of this unit through the pipe 86 to the resistance valve 75 to the pipe 74 and into the central chamber of the stabilizer valve and through to the pipe 73 to the front resistance valve 24, passing then through the pipe 29 into the front end of the right front unit.

As previously set forth, the resistance valves 24 and 75 are of slightly different construction. These valves operate only to resist the rebound motion of the vehicle springs.

The front resistance valve resists the flow of fluid into the front ends of the front impeller units since the rebound motion of the front springs moves the pistons of the front units rearwardly in their cylinders. The rear resistance valve 75, which is connected in the pipe that joins the rear ends of the rear impeller units, resists the flow of fluid out of the rear ends of these units. Because of the actions stated in connection with the two resistance valves, the stronger springs must be between the disks 78 of the rear valve so that when fluid is forced into either end of this rear valve, as, for example, into the right end, the disk 78 at the right end of this valve will move against the stops and then the fluid pressure will move the plate 79 away from the right disk 78, against the tension of the springs interposed between the disks, to allow the fluid to pass into the middle chamber. From the middle chamber it can then flow out through the line 74 or move the left plate 79 against the stops and then move the left disk 78 away from the plate to allow the fluid to pass out of the left end of this valve. The flow of the fluid is in the direction of least resistance.

If, considering the resistance valve 75, the fluid is forced into both ends at one time, both disks 78 will move into position against their respective stops and the spring 84 will be entirely compressed and before the plates 79 can move away from the disks, the extra strong spring 85 must be compressed. From this it will be seen that when the piston of only one of the rear units moves rearwardly or in rebound direction, there is practically no resistance to the flow of fluid through the resistance valve but as soon as both pistons move, the desired resistance is effected. When the flow of fluid is into the middle portion of the rear resistance valve through the pipe 74 and out of one end of this valve, one plate will move to its stop and the adjacent disk will separate therefrom by compressing the weak spring 83 which offers practically no resistance. If the flow of fluid is out of both ends, the spring 83 will be further compressed to allow the separation of the other disk and plate.

What is claimed is:

1. The combination with a vehicle having a chassis frame and running gear therebeneath including front and rear axles and springs connecting the axles with the frame, of a spring and sway control system, comprising a fluid impeller fluid containing unit secured adjacent each spring and having operative connection with the running gear, each unit having a fluid shock discharge port and a fluid rebound discharge port, a central valve unit for the system having a center and end fluid chambers with fluid pressure opened ports therebetween, a pipe line connecting the rebound discharge ports of two transversely disposed units, a fluid passing flow retarding valve in said pipe line, a pipe connecting said retarding valve with the center chamber of said central valve unit, a fluid flow control valve connected with each end fluid chamber of the central valve unit, a pipe connecting the shock discharge port of each of said adjacent units with a port for a fluid flow control valve, a pipe connecting the rebound discharge port of each of the other impeller units with a port of a fluid flow control valve, a pipe line connecting the shock discharge ports of the said other units, a fluid passing flow retarding valve in said last pipe line, and a pipe connecting said last valve with the center chamber of said central valve unit.

2. The combination with a vehicle having a chassis frame and running gear beneath the frame including front and rear axles and springs connecting the axles with the frame, comprising a piston operated fluid impeller unit adjacent each spring, means connecting the unit between the chassis and the running gear for effecting the movement of the pistons of the units upon relative movement of the frame and gear, said units having front and rear fluid ports, said units being arranged to have the pistons therein move in the same direction upon simultaneous compression of all of the springs and upon simultaneous rebound of all of the springs, pipes connecting together those ports of transversely spaced units which are remote from the other units, pipes leading from the other ports of the units, and fluid actuated valve means having said last pipes connected thereto and having pipe connection with the first-mentioned pipes, which is so constructed and arranged that upon sway of the frame opposing fluid forces will be set up between the units upon one side of the chassis frame and those upon the other side thereof to check such sway.

3. The combination with a vehicle having a chassis frame and running gear beneath the frame including front and rear axles and springs connecting the axles with the frame, of a pair of transversely spaced cylinders at the front and at the rear of the frame, spaced connected pistons in each cylinder, actuating means for the connected pistons of each cylinder, the cylinders and actuating means being connected between the frame and the adjacent running gear, a fluid port at each end of each cylinder, a valve unit common to all of said cylinders and including a hollow body independent spaced pistons movable in the body and dividing the body into a center chamber and end chambers, said independent pistons each having a valved port leading therethrough only from the center chamber to the adjacent end chamber, each piston further having a valved port leading therethrough only from an end chamber to the center chamber, said first ports being closed against passage of fluid in either direction when a fluid pressure is established in either end chamber, pipes connecting together the adjacent ends of each pair of cylinders which are remote from the corresponding ends of the other cylinders, the said ends of one pair of cylinders ejecting fluid upon compression of the adjacent springs and the said ends of the other pair of cylinders ejecting fluid upon rebound of the said springs, a fluid flow retarding means in each of said pipes, a pipe establishing connection between each flow retarding means and the central chamber of said valve unit, a pipe leading from the other end of each cylinder to an end chamber of said valve unit, each of said end chambers having two cylinder pipes connected therewith, and flow control means connected between each two cylinder pipes and the chamber to which they lead, said last flow control means including two pressure relief elements each opening from one of the two adjacent pipes toward the adjacent chamber.

4. The combination with a vehicle having a chassis frame and running gear beneath the frame including front and rear axles and springs connecting the axles with the frame, of a pair of transversely spaced cylinders at the front and at the rear of the frame, spaced connected pistons in each cylinder, actuating means for the connected pistons of each cylinder, the cylinders and actuating means being connected between the frame and the adjacent running gear, a fluid port at each end of each cylinder, a valve unit common to all of said cylinders and including a hollow body, independent spaced pistons movable in the body and dividing the body into a center chamber and end chambers, said independent pistons each having a valved port leading therethrough only from the center chamber to the adjacent end chamber, each piston further having a valved port leading therethrough only from an end chamber to the center chamber, said first ports being closed against passage of fluid in either direction when a fluid pressure is established in either end chamber, pipes connecting together the adjacent ends of each pair of cylinders which are remote from the corresponding ends of the other cylinders, the said ends of one pair of cylinders ejecting fluid upon compression of the adjacent springs and the said ends of the other pair of cylinders ejecting fluid upon rebound of the said springs, a fluid flow retarding means in each of said pipes, a pipe establishing connection between each flow retarding means and the central chamber of said valve unit, a pipe leading from the other end of each cylinder to an end chamber of said valve unit, each of said end chambers having two cylinder pipes connected therewith, flow control means connected between each two cylinder pipes and the chamber to which they lead, said last flow control means including two pressure relief elements each opening from one of the two adjacent pipes toward the adjacent chamber, a cross-over connection between the said flow control means, and means whereby fluid pressure transmitted back from the adjacent chamber into the flow control means between said pressure relief elements may pass through the cross-over connection to the other flow control means.

5. The combination with a vehicle having a chassis frame and running gear beneath the frame including front and rear axles and springs connecting the axles with the frame, of a pair of transversely spaced cylinders at the front and at the rear of the frame, spaced connected pistons in each cylinder, actuating means for the connected pistons of each cylinder, the cylinders and actuating means being connected between the frame and the adjacent running gear, a fluid port at each end of each cylinder, a valve unit common to all of said cylinders and including a hollow body, independent spaced pistons movable in the body and dividing the body into a center chamber and end chambers, said independent pistons each having a valved port leading therethrough only from the center chamber to the adjacent end chamber, each piston further having a valve port leading therethrough only from an end chamber to the center chamber, said first ports being closed against passage of fluid in either direction when a fluid pressure is established in either end chamber, pipes connecting together the adjacent ends of each pair of cylinders which are remote from the corresponding ends of the other cylinders, the said ends of one pair of cylinders ejecting fluid upon compression of the adjacent springs and the said ends of the other pair of cylinders ejecting fluid upon rebound of the said springs, a fluid flow retarding means in each of said pipes, a pipe establishing connection between each flow retarding means and the central chamber of said valve unit, a pipe leading from the other end of each cylinder to an end chamber of said valve unit, each of said end chambers having two cylinder pipes connected therewith, flow control means connected between each two cylinder pipes and the chamber to which they lead, said last flow control means including two pressure relief elements each opening from one of the two adjacent pipes toward the adjacent chamber, each of the said cylinders of one pair having a fluid passage by-passing the pistons therein, one of the pistons of each of said one pair of cylinders normally closing one end of the by-pass passage, and a flap valve closing the other end of said passage, the said other end of the passage opening into the cylinder between the other piston therein and the adjacent end of the cylinder.

6. The combination with a vehicle having a chassis frame and running gear beneath the frame including front and rear axles and springs connecting the axles with the frame, of a pair of transversely spaced cylinders at the front end of the vehicle, a pair of transversely spaced cylinders at the rear end of the vehicle, pistons in said cylinders, an operative connection between the piston of each cylinder and the adjacent running gear, said connections being such that upon application of shock to the springs, the pistons will move in the same direction for the ejection of fluid from each of the cylinders through one end thereof, the other ends of the cylinders having fluid ports through which fluid is ejected upon rebound of the springs, a pipe line connecting those ends of one pair of cylinders through which fluid is ejected under shock, a pipe line connecting those ends of the other pair of cylinders through which fluid is ejected under rebound, a fluid flow resisting valve in each of said pipe lines, each of said valves having a central port between the points of connection in the adjacent pipe line, a valve unit common to all of said cylinders and including a central valve body and lateral auxiliary valve bodies, said central valve body having two spaced relatively movable valved pistons therein dividing the central body into a central chamber and end chambers, each of said end chambers being in communication with an auxiliary valve body, a pipe connecting the central port of each flow retarding valve with said central chamber of the central valve body, a pipe connecting the port of each of the first-mentioned pair of cylinders from which fluid flows under rebound with an auxiliary valve body, a pipe connecting a port of each of the second-mentioned pair of cylinders from which fluid flows under shock, with an auxiliary valve body, and fluid actuated units in each of the auxiliary valve bodies between the pipes connected therewith and the pipe connection of the same with the adjacent end chamber of the central valve body for retarding the flow of fluid into the auxiliary valve body and directing such flow into the adjacent central body end chamber.

7. The combination with a vehicle having a chassis frame and running gear beneath the frame including front and rear axles and springs connecting the axles with the frame, of a pair of transversely spaced cylinders at the front end of the vehicle, a pair of transversely spaced cylinders at the rear end of the vehicle pistons in said cylinders, an operative connection between the piston of each cylinder and the adjacent running gear, said connections being such that upon application of shock to the springs, the pistons will move in the same direction for the ejection of fluid from each of the cylinders through one end thereof, the other ends of the cylinders having fluid ports through which fluid is ejected upon rebound of the springs, a pipe line connecting those ends of one pair of cylinders through which fluid is ejected under shock, a pipe line connecting those ends of the other pair of cylinders through which fluid is ejected under rebound, a fluid flow resisting valve in each of said pipe lines, each of said valves having a central port between the points of connection in the adjacent pipe line, a valve unit common to all of said cylinders and including a central valve body and lateral auxiliary valve bodies, said central valve body having two spaced relatively movable valved pistons therein dividing the central body into a central chamber and end chambers, each of said end chambers being in communication with an auxiliary valve body, a pipe connecting the central port of each flow retarding valve with said central chamber of the central valve body, a pipe connecting the port of each of the first-mentioned pair of cylinders from which fluid flows under rebound with an auxiliary valve body, a pipe connecting a port of each of the second-mentioned pair of cylinders from which fluid flows under shock, with an auxiliary valve body, fluid actuated units in each of the auxiliary valve bodies between the pipes connected therewith and the pipe connection of the same with the adjacent end chamber of the central valve body for retarding the flow of fluid into the auxiliary valve body and directing such flow into the adjacent central body end chamber, a cross-over pipe connecting each of said auxiliary valve bodies and having at each end two discharge ports leading into the adjacent auxiliary body, the said relatively movable units of each auxiliary valve body each being adapted to close a port, and a check valve opening inwardly from each end of said cross-over pipe toward the area in each of said auxiliary valve bodies between the relatively movable units therein.

8. The combination with a vehicle having a chassis frame and running gear beneath the frame including front and rear axles and springs connecting the axles with the frame, of a pair of transversely spaced cylinders at the front end of the vehicle, a pair of transversely spaced cylinders at the rear end of the vehicle pistons in said cylinders, an operative connection between the piston of each cylinder and the adjacent running gear, said connections being such that upon application of shock to the springs, the pistons will move in the same direction for the ejection of fluid from each of the cylinders through one end thereof, the other ends of the cylinders having fluid ports through which fluid is ejected upon rebound of the springs, a pipe line connecting those ends of one pair of cylinders through which fluid is ejected under shock, a pipe line connecting those ends of the other pair of cylinders through which fluid is ejected under rebound, a fluid flow resisting valve in each of said pipe lines, each of said valves having a central port between the points of connection in the adjacent pipe line, a valve unit common to all of said cylinders and including a central valve body and lateral auxiliary valve bodies, said central valve body having two spaced relatively movable valved pistons therein dividing the central body into a central chamber and end chambers, each of said end chambers being in communication with the central part of an auxiliary valve body, a pipe connecting the central port of each flow retarding valve with said central chamber of the central valve body, a pipe connecting the port of each of the first-mentioned pair of cylinders from which fluid flows under rebound with an auxiliary valve body, a pipe connecting a port of each of the second-mentioned pair of cylinders from which fluid flows under shock, with an auxiliary valve body, fluid actuated valved units in each of the auxiliary valve bodies between the pipes connected therewith and the pipe connection of the same with the adjacent end chamber of the central valve body for passing the fluid through the auxiliary valve body into the central part thereof, a cross-over pipe connecting each of said auxiliary valve bodies and having at each end two discharge ports leading into the adjacent auxiliary body, the said relatively movable units of each auxiliary valve body being adapted when in one position to close a port, and a check valve opening inwardly from each end of said cross-over pipe toward the area in each of said auxiliary valve bodies between the relatively movable units therein, those pipes carrying fluid under shock from the last-mentioned pair of cylinders each being connected with the auxiliary valve body remote therefrom.

9. A fluid impeller and reservoir unit for use in a system of the character described, comprising a cylinder having end walls each provided with a fluid port, a pair of piston members within the cylinder, coupling means between the piston members whereby the same are moved in unison, rock means connected with the coupling means of said piston members whereby the unitary movement of the same may be effected from the exterior of the cylinder, a fluid by-pass passage extending longitudinally of the cylinder and opening at each end into the same, one end of said passage opening into the cylinder between a piston and the adjacent end wall thereof, the other end of the passage opening into the cylinder inwardly of the adjacent end wall and in a position to be covered by the adjacent piston, and a flap valve closing the first-mentioned end of said passage and opening into the cylinder, said connected pistons when in central position in the cylinder being disposed with one thereof spaced from the flap valve controlled port of the passage and the other in closing position with respect to the other port of said passage.

CARL A. TSCHANZ.